CONTROL SYSTEMS FOR SWITCHING TRANSISTORS

Filed June 22, 1956 2 Sheets-Sheet 1

WITNESSES

Robert C Baird

Leon M. Garman

INVENTOR

Howard W. Collins.

BY Ezra W. Savage

ATTORNEY

Oct. 8, 1957 H. W. COLLINS 2,809,303

CONTROL SYSTEMS FOR SWITCHING TRANSISTORS

Filed June 22, 1956 2 Sheets-Sheet 2

2,809,303

CONTROL SYSTEMS FOR SWITCHING TRANSISTORS

Howard W. Collins, Pittsburgh, Pa., assignor to Westinghouse Electric Corporation, East Pittsburgh, Pa., a corporation of Pennsylvania Application June 22, 1956, Serial No. 593,200

11 Claims. (Cl. 307—88)

The invention relates generally to control systems and more particularly to control systems for switching transistors.

An object of the invention is to provide for utilizing a magnetic amplifier supplied with a square wave voltage to effect the functioning of a transistor as a switch to control the flow of current to a load, the magnetic amplifier and transistor cooperating to cause the delivery of an output current having a predetermined proportional relationship to the input to the magnetic amplifier as determined by an input signal, the combination cooperating to effect a high gain over the input.

It is also an object of the invention to provide a coupling between a power source and an output having predetermined characteristics which effects the delivery of an output proportional to a signal delivered and having corresponding linear characteristics.

Other objects of the invention will, in part, be obvious and will, in part, appear hereinafter.

The invention accordingly comprises the features of construction, combination of elements and arrangement of parts which will be exemplified in the system hereinafter set forth and the scope of the application of which will be indicated in the claims.

For a fuller understanding of the nature and objects of the invention, reference may be had to the following detailed description taken in connection with the accompanying drawing, in which.

Figure 1:
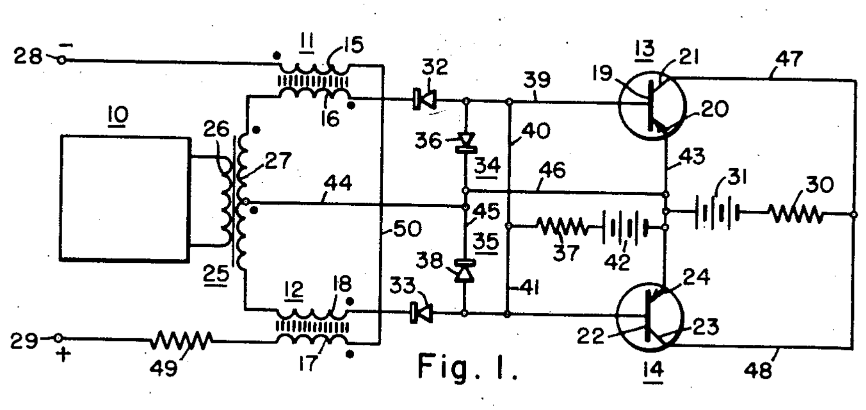
Figure 1 is a diagram of the circuit connections of a control switching system embodying the features of the invention.

Referring now to the drawing and Fig. 1 in particular, the switching system illustrated comprises generally a power source 10, two magnetic amplifiers shown generally at 11 and 12 and two transistors shown generally at 13 and 14 and the necessary circuit connections to enable them to perform predetermined functions which will be described in detail hereinafter.

The power source shown generally at 10 may be a transistor inverter or any other suitable power source for delivering a square wave voltage. Devices of this kind are known in the art and need not be described in detail.

The magnetic amplifiers 11 and 12 may be of any well known type commonly used in control circuits for getting a predetermined gain. The gain obtained from the magnetic amplifiers will depend on the specification for which they have been designed.

Magnetic amplifier 11 is provided with a control winding 15 and a power winding 16 while the magnetic amplifier 12 comprises a control winding 17 and a power winding 18.

The transistors 13 and 14 may be of any well known type provided with N-P-N or P-N-P junctions. The transistor 13 comprises a base 19, an emitter 20 and a collector 21 and the transistor 14 is provided with a base 22, an emitter 23 and a collector 24.

In this particular embodiment of the invention a center tap transformer shown generally at 25 is disposed between the voltage source 10 and the magnetic amplifiers 11 and 12. The primary winding 26 of the transformer 25 is connected to the power source 10. The secondary winding 27 is connected in series circuit relationship with the power windings of the magnetic amplifiers 11 and 12 respectively. The power windings 16 and 18 are disposed on opposite sides of the secondary winding 27. The size of the transformer 25 and the ratio of the primary and secondary windings will depend on the specification to be met.

The control windings 15 and 17 of the magnetic amplifiers 11 and 12 respectively are connected in series circuit relationship and to terminals 28 and 29 or any signal source with which the switching system is to be utilized. As an example, a switching system of this kind could be utilized in conjunction with an electric furnace to control the heating. The signal could be delivered from a thermometer or pyrometer used in conjunction with the furnace to control temperatures. In this illustration the load 30 may be, for example, a motor operated to regulate a furnace or machine connected to an independent power source 31 through the switching transistors 13 and 14.

In order to control the direction of flow of the current between the magnetic amplifiers 11 and 12 and the switching transistors 13 and 14, respectively, rectifiers 32 and 33 are provided. The rectifier 32 is disposed in the circuit extending from the transistor base 19 to a terminal of the power winding 16 of the magnetic amplifier 11. Rectifier 33 is connected in the circuit extending between the base 24 of the transistor 14 and the power winding 18 of the magnetic amplifier 12.

The center tap of the transformer 25 is connected to a circuit extending between the emitters 20 and 24 of the switching transistors 13 and 14, respectively.

It is well known that in circuit systems such as described that after the transistors 13 and 14 are rendered non-conductive in the power circuits, that a small magnetizing current will continue to flow and through high dissipation and heating a build-up will occur that causes undesirable heating of the transistors. In fact, it may result in thermal runaway and the burning out of a transistor. In order to assure the complete shutting-off of the transistors 13 and 14, when they are rendered substantially non-conductive in the functioning of the system, non-linear devices which will be described in more detail hereinafter are provided and connected to the transistors 13 and 14.

A number of non-linear devices are employed in the circuits to be described and traced hereinafter. Each non-linear device comprises a rectifier and resistor so connected in the circuits that they permit the flow of small currents without any appreciable voltage drop and they protect circuits and apparatus from excessive current flow. Further, as the description proceeds and the circuits are traced it will seem that the electric currents flow through the electrodes or diodes of the non-linear devices in the backward or reverse direction; however, what actually happens is there is a reduction in the current flow in the forward direction. This reduction in the current flow may be predetermined by design to give the performance of functions required from the control system.

In the control system illustrated in Fig. 1 two non-linear devices shown generally at 34 and 35 are employed. The non-linear device 34 comprises a rectifier 36 and a resistor 37. The non-linear device 35 comprises a rectifier 38 and utilizes the resistor 37 which also is employed in conjunction with rectifier 36 to make the non-linear device 34. The rectifiers 36 and 38 are connected to one another and in opposed relationship between the conductors 39 and 40. As shown, the conductor 39 extends between the base of the transistor 13 and the power winding 16 of magnetic amplifier 11 and the conductor 40 extends between the base 22 of the transistor 14 and the power winding 18 of the magnetic amplifier 12. The resistor 37 is connected to the rectifier 34 through conductor 40 and to the rectifier 38 through a conductor 41. A direct current power source 42 is connected between the resistor 37 and the conductor 43 extending between the emitters 20 and 24 of the transistors 13 and 14 respectively. The positive terminal of the power source 42 is connected to the resistor 37.

The center tap of the transformer 25 is connected through conductor 44 to the conductor 45 connecting the rectifiers 36 and 38, and through conductor 46 to the conductor 43 connecting the emitters 20 and 24 of the transistors 13 and 14 respectively.

The frequency of the power source 10 may be varied appreciably. It may be 60 cycles or even lower and up to 10 kilocycles and above. Experiment seems to indicate that most advantages occur from 1 kilocycle to 5 kilocycles. The frequency selected will depend greatly upon the transistor characteristics.

Assuming now that the power source 10 supplies a square wave voltage of predetermined frequency to the transformer 25, then current for one half cycle, for example the positive half cycle, will flow from the secondary winding 27 of the transformer 25 through conductors 44, 46 and 43 to the emitter 20, causing carriers to flow in the transistor rendering it readily conductive, then through the base 19, conductor 39, rectifier 32, the power winding 16 of the magnetic amplifier back to the secondary winding of the transformer.

During the same positive half cycle current will flow from the secondary winding 27 of the transformer 25 through conductors 44, 46 and 43, emitter 24 of the transistor 14, causing carriers to flow and rendering the transistor readily conductive, then through conductors 41 and 40, rectifier 32, power winding 16 of the magnetic amplifier 11 back to the secondary winding of the transformer.

Therefore, on the first positive half cycle both of the transistors 13 and 14 will fire and become highly conductive. The firing of both transistors sets up two circuits from the power source 31. One circuit extends from the positive terminal of the power source 31 through conductor 43, the emitter 20, the base 19 and the collector 21 of the transistor 13, conductor 47 and load 30, back to the power source. The other circuit extends from the positive terminal of the power source 31 through conductor 43 to the emitter 24, base 22, collector 23, conductor 48 and load 30 back to the power source.

It will be noted that in both circuits traced hereinbefore that the current flows through the load 30 in the same direction. Since both of the transistors 13 and 14 have been fired the gain will be increased over a circuit arrangement in which only one transistor is fired.

On the next half cycle, for example, the negative half cycle, current flows from the secondary 27 of the transformer 25 through conductors 44, 46 and 43 to the emitter 20 of the transistor 13, effecting the firing of the transistor, the base 19, conductors 39 and 40, rectifier 33, the power winding 18 of the magnetic amplifier 12 back to the transformer. At the same time another circuit is established which extends from the transformer secondary winding 27, conductors 44, 46 and 43 to the emitter 24, causing carriers to flow and rendering the transistor 14 highly conductive, then through the base 22, rectifier 33, the power winding 18 of the magnetic amplifier 12 back to the transformer. Again both of the transistors 13 and 14 have been fired and during the negative half cycle two highly conductive circuits to the load are set up through the transistors. These circuits are the same as have been traced hereinbefore.

When the transistors 13 and 14 are first rendered readily conductive and then substantially non-conductive, a small magnetizing current continues to flow from the magnetic amplifier 11 through both of the transistors. Due to the characteristics of transistors a flow of a small current results in a fairly high watt dissipation and consequently heating. As the temperature of the transistors rises the current flow increases and the watt dissipation increases with the result that there may be a thermal run-away. This may cause a burning out of a transistor.

In order to protect the transistors 13 and 14 the non-linear devices 34 and 35 are provided. In conjunction with the non-linear devices a direct current power source 42 is utilized to impose a bias voltage on the bases 19 and 22 of the transistors 13 and 14, respectively. As shown, the power source 42 is connected through resistor 37, conductors 40 and 39 to the base 19 of the transistor 13, and through conductor 41 to the base 22 of the transistor 14.

Therefore, when the positive half cycle of current flowing in the transistor 13 reaches zero the non-linear device 34 functions to prevent the flow of the magnetizing current, flowing in the power winding 16 of the magnetic amplifier 11, from flowing through the transistor 13 and causing a wattage dissipation which heats the transistor. Reference to the drawings will show that a circuit extends from the power source 42, through resistor 37, conductors 40 and 39 to the base 19 of the transistor 13. In this manner a positive voltage is imposed on the base 19 which is slightly greater than the voltage supporting the flow of magnetizing current through the power winding 16 of magnetic amplifier 11. Therefore, as soon as the positive half cycle of current reaches zero the flow of magnetizing current will be interrupted. The transistor 13 therefore completely shuts off the flow of current to load 30.

Considering now the transistor 14, a circuit may be traced from the power source 42 through resistor 37, conductor 41, to the plate 22. Again in the case when the positive half cycle of current reaches zero a positive voltage will be imposed on the base 22 which is slightly greater than the voltage causing the flow of magnetizing current. Consequently, there will be no flow of magnetizing current and no wattage dissipation causing heating of the transistor 14. The flow of current in the transistor 14 to the load will be instantly shut off when the positive half cycle of current reaches zero. Therefore, transistor 14 also performs a clean-cut switching operation.

On the next half cycle current flows from the secondary winding 27 of the transformer 25, through conductors 44, 46 and 43, emitter 20 of the transistor 13, rendering the transistor highly conductive, conductors 39 and 40, rectifier 43, power winding 18 of the rectifier 12. The other transistor circuit extends from the secondary winding 27 of the transformer 25 through conductors 44, 46 and 43 to the emitter 24 of the transistor 14 rendering the transistor highly conductive, the conductor leading to the rectifier 33, the power winding 18 back to the transformer. The two circuits from the power winding 31 through the load 30 previously discussed are completed.

At the end of the second or negative half cycle magnetizing current flowing through the power winding 18 of the magnetic amplifier will tend to flow through the transistors 13 and 14. However, the flowing of this magnetizing current will be blocked by the non-linear devices 34 and 35 in the manner described hereinbefore.

Therefore in this modification of the invention on each half cycle both transistors 13 and 14 will be fired and rendered conductive and at the end of each half cycle the non-linear devices 34 and 35 will cooperate to prevent the flow of magnetizing current and any serious watt dissipation in the transistors 13 and 14. This prevents any serious thermal heating of the transistors.

The gain effected in the magnetic amplifiers may be predetermined by design. Further, it is well known that the gain may be varied within very wide limits. The gain effected in the transistors 13 and 14 may also be changed by design. This gain may also vary within wide limits.

As has been pointed out, a signal may be delivered to the terminals 28 and 29. This signal is usually direct current but may be alternating current, and flows through the control windings 15 and 17 of the magnetic amplifiers 11 and 12 respectively. The circuit may be traced from the positive terminal 29 through the resistor 49, control winding 17, conductor 50, control winding 15 back to the negative terminal 28. The resistor 49 is provided to limit the current flow.

In the functioning of the system a square wave voltage is delivered to the magnetic amplifiers. This results in the delivery of a pulse output to the load 30. In this way it is possible to linearly control the output of the switching transistors by pulse width modulation. The width of the output pulse may be controlled by the signal current flowing in the control windings of the magnetic amplifier. The power gain that may be effected may be varied within wide limits through the use of both magnetic amplifiers and transistors. The switching operation both closing and opening is substantially complete, and the speed with which the flow of current through the transistors may be initiated or interrupted is very high.

If the system is adjusted to give a wide pulse or with a wide rectangular wave, a high average output can be effected. If it is regulated to give a narrow pulse or narrow rectangular wave, a low average output current is obtained. The width of the output pulses delivered can be controlled within a wide range. A predetermined proportional relationship between the output current and the input to the magnetic amplifier may be maintained through the input signal since the power source supplies a square wave voltage.

Figure 2:
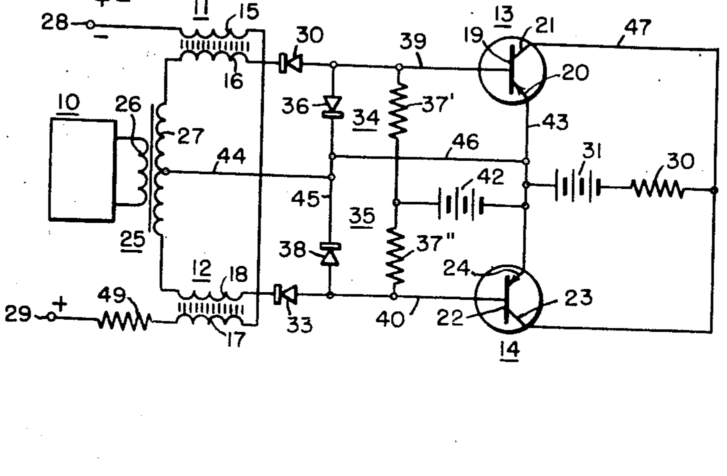
Figure 2 is a circuit diagram showing a control switching system in which the transistors are fired alternately.

Referring now to Fig. 2, which is quite similar to Fig. 1, it will be observed that the non-linear device 34 comprises a rectifier 36 and a resistor 37′. The non-linear device 35 comprises a rectifier 38 and the resistor 37″. As shown, the resistor 37′ is connected between the positive terminal of the power source 42 and the conductor 39 extending between the base 19 and the rectifier 32. The resistor 37′ is connected between the positive terminal of the power source 42 and the conductor extending between the base 22 of the transistor 14 and the rectifier 33.

In the operation of this modification of the invention on the first half or positive half cycle current flows from the secondary winding 27 of the transformer 25 through conductors 44, 46 and 43 to the emitter 20 causing the transistors 13 to fire, thence through to base 19, conductor 39, resistor 32, power winding 16, back to the secondary winding at the transformer. In this modification, current can not flow from the base 22 of the transistor 14, conductor 40, through the conductor 39 as it could in the modification illustrated in Fig. 1. Consequently, on the first half or positive half cycle only one transistor 13 will be fired.

On the second half or negative half cycle current will flow from the secondary transformer through conductors 44, 46 and 43, and emitter 4 causing the transistor 14 to fire and then to the base 22, rectifier 33, power winding 18 of the magnetic amplifier 12, back to the secondary winding of the transformer. Again we find that on the negative half cycle current can not flow through the transistor 13 because of the resistors 37 and 37′ of the non-linear devices 34 and 35, respectively, as it did in the modification shown in Fig. 1. Again only one transistor 14 is fired.

Figure 3:
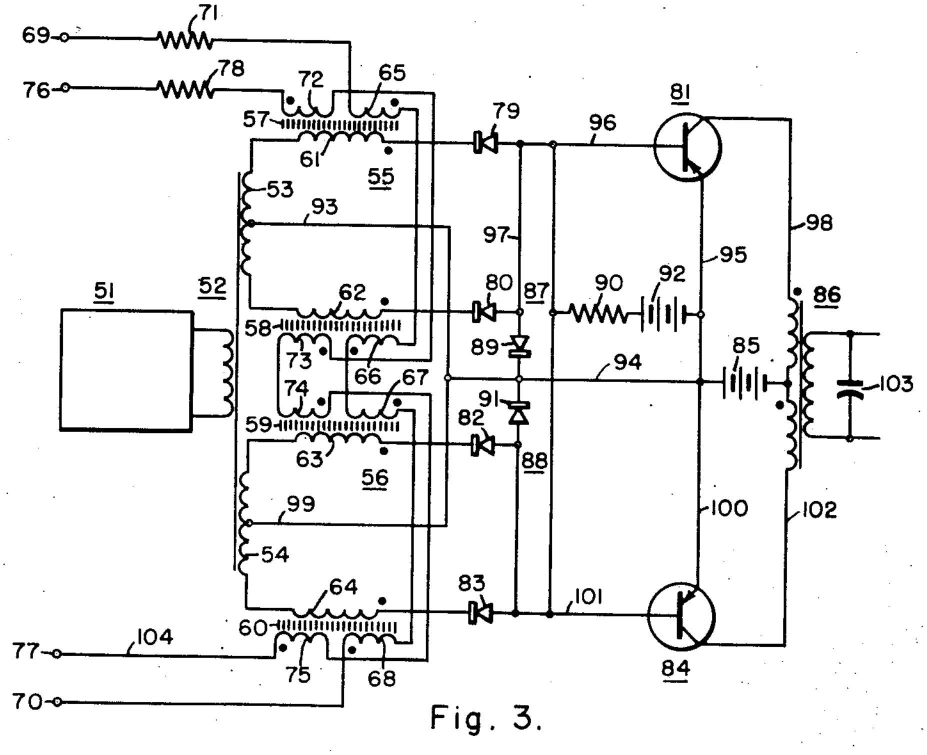
Fig. 3 is a diagram of the circuit connections of a modification of the control system illustrated in Fig. 1 embodying the features of the invention and which gives an alternating current output having a sinusoidal wave form.

Referring now to Fig. 3, a switching system responsive to alternating current signals is provided. In this modification a power source shown generally at 51 for supplying a square wave high frequency voltage is provided as in the modification of Fig. 1.

A transformer shown generally at 52 is provided with a primary winding 53 connected to the square wave voltage source and two center tapped secondary windings 53 and 54 in inductive relationship with the primary winding 53. The frequency of the voltage supply to the transformer 52 will depend on the conditions to be met. It has been found for some purposes that a frequency of the order of 10 kilocycles is satisfactory.

Two magnetic amplifiers shown generally at 55 and 56 are employed. Each magnetic amplifier will have two cores. The magnetic amplifier 55 is provided with cores 57 and 58 and the amplifier 56 with cores 59 and 60. Each core will be provided with a power winding, a control winding and a bias winding. The magnetic amplifier 55 has two power windings 61 and 62 disposed on the cores 57 and 58 respectively. These power windings are connected in series circuit relationship through the secondary winding 53 of the transformer 52 and on opposite sides of this winding. The magnetic amplifier 56 has two power windings 63 and 64 connected to opposite terminals of the secondary winding 54 of the transformer 52 and which are disposed on the cores 59 and 60 respectively.

The cores 57, 58, 59 and 60 have bias windings 65, 66, 67 and 68 respectively. These bias windings are supplied from a suitable direct current power source and are all connected in series circuit relationship across the terminals 69 and 70. The voltage supplied will depend on the requirements of the particular system and will be determined by the functions to be performed. The flow of current in the bias windings may be limited to a predetermined extent by a resistor 71.

The cores 57, 58, 59 and 60 are provided with control windings 72, 73, 74 and 75 respectively. These control windings are connected in series circuit relationship and receive the signal current through terminals 76 and 77. Resistor 78 is connected in series circuit relationship with the control windings.

In this modification the control windings 72, 73, 74 and 75 are connected in series circuit relationship and across the terminals 76 and 77.

The power windings 61 and 62 of the magnetic amplifier 55 are connected through rectifiers 79 and 80 to the base of a transistor shown generally at 81. The power windings 63 and 64 of the magnetic amplifier 56 are connected through rectifiers 82 and 83 respectively to the base of the transistor shown generally at 84. A suitable power source 85 is connected to the transistors 81 and 84. As shown the transistors 81 and 84 are connected across a center tapped output transformer shown generally at 86.

In order to provide for more positive control and functioning of the transistors 81 and 82 two non-linear devices shown generally at 87 and 88 are provided. The non-linear device 87 comprises a rectifier 89 and a resistor 90. The non-linear device 88 includes the rectifier 91 and makes use of the same resistor as the non-linear device 87, that is the resistor 90. A source of direct current power 92 is provided for biasing the non-linear devices 87 and 88. The manner in which the non-linear devices are connected in the system will appear as the circuits are traced when describing the functioning of the system.

It will be assumed that a predetermined bias voltage is applied across the terminals 69 and 70 and that the voltage source of a square wave voltage has been energized and that the terminals 76 and 77 are connected across some signal source and that an alternating current signal current is flowing.

On the positive half of a cycle, current flows from the secondary winding 53 of the transformer 52 through conductors 93, 94 and 95 to the emitter of the transistor 81, causing carriers to flow rendering the transistor readily conductive, then through conductor 96, rectifier 79, power winding 61 of the amplifier 55 back to the transformer. It will be noted that the plate of transistor 81 is connected through conductors 96 and 97 to the power winding 62 of the magnetic amplifier 55. However, in view of the bias winding current does not flow from conductor 97 through rectifier 80 to the power winding because the potentials are substantially the same.

When the transistor 81 has been rendered readily conductive, current flows from the power source 85 through conductor 95, transistor 81, conductor 98, the primary winding of the transformer 86 back to the power source. The transformer 86 is now energized and will deliver an output. On the second or negative half of the wave, current flows from the center tapped secondary winding of the transformer 52 through conductors 99, 94 and 100 to the transistor 84, causing carriers to flow and rendering the transistor readily conductive, conductor 101, rectifier 83, power winding 64 of the magnetic amplifier 56 back to the transformer. When the transistor 84 has been rendered readily conductive, current will flow from the power source 85 through conductor 100, transistor 84, conductor 102, one section of the primary winding of the transformer 86 back to the power source. On this half cycle the current flows in the primary winding of the transformer 86 in a direction opposite to the direction of flow on the positive half cycle and during the full cycle two pulses in the opposite direction are delivered to the transformer 86. The output of the transformer 86 is a series of pulses in the opposite direction.

In this instance a capacitor 103 is connected across the secondary winding of the transformer 86 and this converts the pulses in the opposite direction into a wave form simulating a sinusoidal alternating current wave. The non-linear devices 87 and 88 cooperate with the transistors 81 and 84 respectively. As soon as the transistor 81 becomes substantially non-conductive, the non-linear device 87 imposes a voltage on the base that is greater than the voltage on the emitter and no current will flow. This renders the transistor competely non-conductive and eliminates all possibility of a thermal runaway as explained in connection with the modification in Fig. 1. In the same way the non-linear device 88 imposes a voltage on the plate of the transistor 84 greater than the voltage on the emitter with the result that at the end of a pulse the flow of current through the transistor is completely interrupted.

The signal circuit extends from terminal 76 through resistor 78, control windings 72 and 73 of the magnetic amplifier 55, control windings 74 and 75 of the magnetic amplifier 56 and conductor 104 to the terminal 77.

This modification of the invention is adapted for receiving alternating current signals. The signals may be varied through a wide band of frequencies but a 60 cycle frequency is one of the most common. The signal functions to control the width of the pulse delivered by the transformer 86. In this manner the output from the transformer 86 is made proportional to the input signal.

Figure 4:
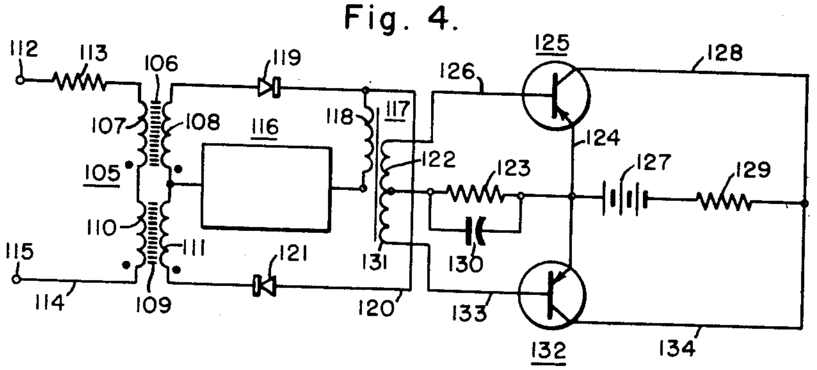
Fig. 4 is a circuit diagram of a second modification of the control system illustrated in Fig. 1 which gives a single direct current output.

Referring to the modification of the invention illustrated in Fig. 4, a magnetic amplifier shown generally at 105 is provided with two cores, each core having a power winding and a control winding. A core 106 has a control winding 107 and a power winding 108. A core 109 has a control winding 110 and a power winding 111. The signal circuit may be traced from the terminal 112 through the resistor 113, the control windings 107 and 110 and conductor 114 to the terminal 115.

The source of power 116 supplies a square wave voltage and is connected to a terminal between the power windings 108 and 111 of the magnetic amplifier and to one terminal of the primary winding of the coupling transformer shown generally at 117. The source of power for the square wave voltage gives the magnetic amplifier 105 a linear characteristic.

In operation the circuit for the current from the power source 116 extends on one half cycle through the power winding 108 of the magnetic amplifier 105, the rectifier 119, the primary winding 118 of the transformer 117 back to the power source. On the next half cycle current flows from the power source 116 through primary winding 118, conductor 120, rectifier 121, the power winding 111 of the magnetic amplifier 105 back to the power source 116.

On the first half cycle when the transformer is energized current will flow from the secondary winding 122 through resistor 123, conductor 124 to the emitter of the transistor shown generally at 125 causing carriers to flow and rendering the transistor readily conductive, the base of the transistor and conductor 126 back to the transformer.

As soon as the transistor 125 is fired current from the power source 127 will flow through the conductor 124, transistor 125, conductor 128 to the load 129 back to the power source 127.

On the completion of the half cycle the capacitor 130 connected in parallel circuit relationship with resistor 123 is charged and as soon as the current flowing in the winding 122 reaches zero the capacitor will discharge and impose a voltage on the base of the transistor 125 in opposition to the power source 127. The result is that any leakage current through the transistor 125 will be blocked and the transistor will be completely shut off or rendered so highly resistant that there is no danger of a build-up of the current in the transistor resulting in thermal runaway. On the next half cycle current will flow from the secondary winding 131 of the transformer 117 through resistor 123 to the emitter of the transistor shown generally at 132. This will cause carriers to flow and render the transistor 132 highly conductive and current will flow through the base and conductor 133 back to the transformer. Current again will flow from the power source 127 through the transistor 132, conductor 134 to the load 129 and back to the power source. It will be observed that the current from transistor 132 flows in the same direction through the load 129 as the current from the transistor 125. Therefore, the pulses of current from both transistors flow the same direction through the load.

On the completion of the second half cycle when the current in the transformer winding 131 reaches zero, the condenser 130 will be discharged to impose a voltage on the base of the transistor 132 in opposition to the voltage from the power source 127. Consequently the transistor 132 will not be affected by any leakage current and will be rendered highly resistant to the flow of current instantly on the completion of the second half of the current wave. Consequently, the transistor will serve as a switching device which will first carry a very high current and then cut off the flow of current instantly. The signal current which is received across the terminals 112 and 115 will control the duration or width of the wave delivered by the power source 116. Consequently, the current delivered to the output 129 will be proportional to the signal current received and delivered to the control windings 107—110 of the magnetic amplifier.

Figure 5:
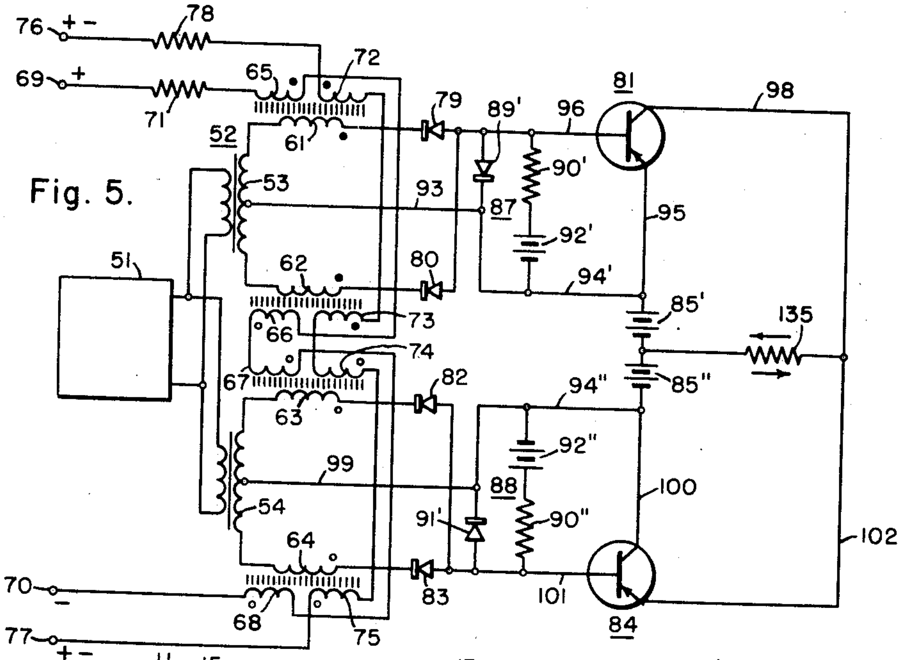
Fig. 5 is a diagram of circuit connections of a modification of the invention illustrated in Fig. 1 which gives a direct current output of double polarity.

The modification illustrated in Fig. 5 has many of the same features as the modification as illustrated in Fig. 3. It employs two magnetic amplifiers, each having two cores. It has a bias winding supplied from the terminals 76 and 77. The signal circuit supplied from the terminals 69 and 70 is adapted to receive varying positive and negative D. C. signal currents.

The non-linear device 87 comprises a rectifier 89′ and a resistor 90′. A separate biasing power source 92′ is provided for the non-linear device 87. The connections of the non-linear device and the separate pulsating power source will appear as the circuits are traced.

The non-linear device 88 comprises a rectifier 91′, and a resistor 90″. A separate baising power source 92 is provided for the non-linear device 88. The power circuits controlled by the transistors 81 and 84 are each provided with separate power sources. A separate power source 85′ is provided in conjunction with the power circuit controlled by the power transistor 81. The power circuit controlled by the transistor 84 is provided with a power source 85″. In the operation of the system, it will be assumed that direct current power is being supplied to the biasing windings 72, 73, 74 and 75 and that a periodically reversed direct current signal is being supplied to the signal circuit. In addition, the source of power 51 for supplying a square wave voltage is also in operation. The functioning of the magnetic amplifiers and the power source 51 will be the same as described for the modification illustrated in Fig. 3. However, the circuit for controlling the transistors 81 and 84 and the power circuits set up will be different. These circuits will now be traced. On the first half wave, current will flow from the secondary winding 53 of the transformer 52 through conductors 93, 94′ and 95 to the emitter of the transistor 81 rendering it highly conductive and then through the conductor 96, rectifier 79, power winding 61 of the magnetic amplifier 55, back to the secondary winding of the transistor. Current now flows from the power source 85′ through conductor 95, transistor 81, conductor 98, through the load 135 back to the power source. When the first half or positive half cycle reaches zero the non-linear device 87 will function. A circuit will be established extending from the power source 92′ through resistor 90′, conductor 96, transistor 81, conductors 94′ back to the power source. Therefore, a voltage will be imposed on the base of the transistor 81 which is slightly greater than the voltage supporting the flow of magnetizing current through the power winding 61 of the magnetic amplifier 55. Therefore, at the end of the first half cycle the transistor will cease to be conductive and will not be subject to heating currents.

When the transistor 81 is fired, a power circuit will be established from the power source 85′ to the conductor 95, transistor 81, conductor 98, the load 135 back to the power source. The current in the load flows in the direction indicated by the top arrow.

On the negative or second half of the current cycle current will flow from the secondary winding 54 of the transformer 52 through conductors 99, 94″ and 100 to the transistor 84, rendering it readily conductive and then through conductor 101, rectifier 83, the power winding 64 of the magnetic amplifier 56 back to the secondary of the transformer.

When the transistor 84 is fired, a power circuit is established which extends from the positive terminal of the power source 85″ through the load 135, conductor 102, transistor 84, conductor 100, back to the power source. The current flows through the load 135 in the direction indicated by the lower arrow.

When the negative curent cycle reaches zero, the non-linear device 88 will function and a circuit will be established from the biasing power source 92″ through resistor 90″, conductor 101. The transistor 84 will become non-conducting and causes a complete interruption of the power circuit through the power source 85″.

It will be observed that on the alternating firing of the transistors 81 and 84, direct current is caused to flow in the opposite directions through the load 135. Thus, we have provided a double polarity direct current for the load 135. A current supply of this kind would be utilized to drive a motor in opposite directions to perform a control operation.

Since certain changes may be made in the above construction different embodiments of the invention could be made without departing from the scope thereof, it is intended that all matter contained in the foregoing description or shown in the accompanying drawings shall be interpreted as illustrative and not in a limiting sense.

I claim as my invention:

1. In a control switching system for controlling the supply of power to a load, in combination, a power source for delivering a square wave voltage, a magnetic amplifier provided with power and control windings, the amplifier having high gain and linear characteristics, the power winding of the amplifier being connected to the power source to receive the square wave voltage, a transistor provided with a base, an emitter and a collector, the base of the transistor being connected to one terminal and the emitter to another terminal of the power winding of the magnetic amplifier, a rectifier disposed in the connections between the power winding of the magnetic amplifier and the base of the transistor to restrict the flow of current from the power winding of the magnetic amplifier to the base of the transistor, and a source of direct current power for supplying the load connected between the emitter and collector of the transistor, the transistor serving as a switch to control the flow of current from the direct current source to the load.

2. In a control switching system for controlling the supply of power to a load, in combination, a power source for delivering a square wave voltage, a magnetic amplifier provided with power and control windings, the amplifier having high gain and linear characteristics, the power winding being connected to the power source to receive the square wave voltage, a transistor provided with a base, an emitter and a collector, the base of the transistor being connected to one terminal and the emitter to another terminal of the power winding of the magnetic amplifier, a rectifier disposed in the connections between the power winding of the magnetic amplifier and the base of the transistor to restrict the flow of current from the power winding of the magnetic amplifier to the base of the transistor, a source of direct current power for supplying the load connected between the emitter and collector of the transistor, the transistor serving as a switch to control the flow of current from direct current source to the load, a biasing power source and a non-linear device connected in series circuit relationship with the biasing power source and across the base and emitter of the transistor to cooperate in controlling the flow of the magnetizing current from the magnetic amplifier through the transistor.

3. In a control switching system for controlling the supply of power to a load, in combination, a power source for delivering a square wave voltage, a magnetic amplifier provided with power and control windings, the amplifier having high gain and linear characteristics, the power winding being connected to the power source to receive the square wave voltage, a transistor provided with a base, an emitter and a collector, the base of the transistor being connected to one terminal and the emitter to another terminal of the power winding of the magnetic amplifier, a rectifier disposed in the connections between the power winding of the magnetic amplifier and the base of the transistor to restrict the flow of current from the power winding of the magnetic amplifier and the base of the transistor, a source of direct current power for supplying the load connected between the emitter and collector of the transistor, the transistor serving as a switch to control the flow of current from the direct current source to the load, and a non-linear device connected to a source of direct current, the non-linear device and source of direct current power being connected across the base and emitter of the transistor, the non-linear device cooperating to render the base of the transistor positive with respect to the emitter, thereby serving to render the transistor substantially non-conductive to prevent the build-up of currents which will cause heating and serving as a by-pass circuit across the transistor when the flow of current through the transistor to the load is interrupted, 4. In a control switching system for controlling the supply of power to a load, in combination, a power source for delivering a square wave voltage, a plurality of magnetic amplifiers provided with power and control windings, the amplifiers having high gain and linear characteristics, the power winding of each magnetic amplifier being connected to the power source, a plurality of transistors connected to the magnetic amplifiers and the power source, a power source for supplying current to the load, a plurality of circuits connecting the power source to deliver load current, a transistor connected into each load circuit, and means connected into the circuits between the magnetic amplifiers and transistors for controlling the direction of the flow of current whereby when power is supplied from the square wave voltage the transistors are fired alternately to cause a flow of current from the power source alternately in the circuits supplying electric current to the load.

5. In a control switching system for controlling the supply of power to a load, in combination, a power source for delivering a square wave voltage, a plurality of magnetic amplifiers each provided with a power winding and a control winding, a plurality of transistors, each transistor being connected to a power winding of a magnetic amplifier and the source of power for supplying a square wave voltage, a source of power for supplying current to the load, a plurality of circuits connecting the power source to the load, a transistor connected in each circuit for controlling the flow of current from the power source to the load, means connected in the circuits between the magnetic amplifiers and the transistors for controlling the direction of flow of the current from the magnetic amplifiers through the transistors, the transistors and magnetic amplifiers being so interconnected that the transistors are fired alternately to effect the supply of current from the power source alternately through the load circuits and non-linear devices connected in the circuits between the magnetic amplifiers and corresponding transistors to prevent the flow of current through the transistors when they are shut off to control the thermal heating of the transistors.

6. In a control switching system for controlling the supply of power to a load, in combination, a power source for delivering a square wave voltage, a plurality of magnetic amplifiers, each provided with power, control and biasing windings and each connected to the power source for delivering a square wave voltage, a plurality of transistors, each transistor being connected to a corresponding magnetic amplifier and the power source, means connected between the magnetic amplifiers and transistors for controlling the direction of flow of current between the transistors and magnetic amplifiers, a power source for supplying a load, a plurality of circuits for conducting the current from the power source to the load, a transistor connected in each circuit for controlling the flow of current, means for supplying current to the biasing windings of the transistors to control the saturation of the cores whereby the transistors are fired alternately thereby to effect the delivery of current to the load in the form of pulses, and means for delivering signals to the control windings of the magnetic amplifiers to maintain a predetermined proportional relationship between the signals delivered and the width of the pulse waves delivered.

7. In a control switching system for controlling the supply of power to a load, in combination, a power source for delivering a square wave voltage, a plurality of magnetic amplifiers, each provided with power, control and biasing winding and each connected to the power source for delivering a square wave voltage, a plurality of transistors, each transistor being connected to a corresponding magnetic amplifier and the power source, means connected between the magnetic amplifiers and transistors for controlling the direction of flow of current between the transistors and magnetic amplifiers, a power source for supplying a load, a plurality of circuits for conducting the current from the power source to the load, a transistor connected in each circuit for controlling the flow of current, means for supplying current to the biasing windings of the magnetic amplifiers to control the saturation of the cores whereby the transistors are fired alternately thereby to effect the delivery of current to the load in the form of pulses, means for delivering signals to the control windings of the magnetic amplifiers to maintain a predetermined proportional relationship between the signals delivered and the width of the pulse waves delivered, and non-linear devices connected in circuit relation with the transistors to apply a voltage in opposition to the voltage causing magnetizing current to flow in magnetic amplifiers whereby when the transistors are shut off there will be no flow of magnetizing current and the switching operation performed by the transistors will be effective.

8. In a control switching system for controlling the supply of power to a load, in combination, a power source for delivering a square wave voltage, a plurality of magnetic amplifiers, each provided with a plurality of cores, each core being provided with power, control and biasing windings, a plurality of transistors, each transistor being connected to a power winding of a magnetic amplifier and the source of power for supplying a square wave voltage, a source of power for supplying current to the load, a plurality of circuits for connecting the source of power to the load, a transistor connected in each circuit, means provided in the circuit connections between the transistor and magnetic amplifiers to control the direction of flow of current, means for supplying power to the biasing windings of the magnetic amplifiers to control the flow of current from the source of power supplying the square wave voltage to effect the firing of the transistors alternately, means for supplying current to the control winding of each transistor for maintaining a predetermined proportional relationship between the signal current and the pulse currents flowing in the circuits to the load.

9. In a control switching system for controlling the supply of power to a load, in combination, a power source for delivering a square wave voltage, a plurality of magnetic amplifiers, each provided with a plurality of cores, each core being provided with power, control and biasing windings, a plurality of transistors, each transistor being connected to a power winding of a magnetic amplifier and the source of power for supplying a square wave voltage, a source of power for supplying current to the load, a plurality of circuits for connecting the source of power to the load, a transistor connected in each circuit, means provided in the circuit connections between the transistor and magnetic amplifiers to control the direction of flow of current, means for supplying power to the biasing windings of the magnetic amplifiers to control the flow of current from the source of power supplying the square wave voltage to effect the firing of the transistors alternately, means for supplying current to the control winding of each transistor for maintaining a predetermined proportional relationship between the signal current and the pulse currents flowing in the circuits to the load, and inductive means and a capacitor connected in parallel circuit relation and into the circuit for supplying current to the load for converting the current flowing through the load terminals to an alternating current of sinusoidal wave form.

10. In a control switching system for controlling the supply of power to a load, in combination, a power source for delivering a square wave voltage, a plurality of magnetic amplifiers each having a plurality of cores, each core having power, biasing and control windings, a plurality of transistors, each transistor being connected to the power windings of a corresponding magnetic amplifier and the source of power for supplying square wave voltages, means disposed in the circuit connections between the magnetic amplifiers and the transistors for controlling the direction of flow of current, a plurality of power sources for supplying current to the load, a circuit for conducting current through each power source to the load, means for supplying current to the biasing windings to effect the firing of the transistors alternately, whereby when the transistors are fired alternately current flows in opposite directions in the circuits provided for supplying current from the individual power sources to the load, thereby to provide a double plurality direct current output.

11. In a control switching system for controlling the supply of power to a load, in combination, a power source for delivering a square wave voltage, a plurality of magnetic amplifiers each having a plurality of cores, each core having power, biasing and control windings, a plurality of transistors, each transistor being connected to the power windings of a corresponding magnetic amplifier and the source of power for supplying square wave voltages, means disposed in the circuit connections between the magnetic amplifiers and the transistor for controlling the direction of flow of current, a plurality of power sources for supplying current to the load, a circuit for conducting current through each power source to the load, means for supplying current to the biasing windings to effect the firing of the transistors alternately, whereby when the transistors are fired alternately current flows in opposite directions in the circuit provided for supplying current from the individual power sources to the load, thereby to provide a double plurality direct current output, and non-linear devices connected in circuit relation with the transistors, a source of power connected to non-linear devices, whereby when a transistor shuts off a voltage is applied across the transistor to oppose the voltage magnetizing current to flow through the magnetic amplifier and the transistors, whereby when the transistor is shut off the interruption of the circuits from the power sources for supplying the load is complete and the watt dissipation is restricted.

No references cited.